United States Patent [19]

Kobayashi

[11] 4,143,882
[45] Mar. 13, 1979

[54] RUBBING CONTACT FLUID SEAL

[75] Inventor: Osamu Kobayashi, Yokohama, Japan

[73] Assignee: Nissan Motor Company, Limited, Japan

[21] Appl. No.: 720,520

[22] Filed: Sep. 3, 1976

[30] Foreign Application Priority Data

Sep. 5, 1975 [JP] Japan ................................ 50-107745

[51] Int. Cl.² ............................................. F16J 15/34
[52] U.S. Cl. ...................................... 277/96.2; 165/9
[58] Field of Search ....................... 277/96, 96.1, 96.2; 165/9

[56] References Cited

U.S. PATENT DOCUMENTS 3,918,925 11/1975 McComas ........................... 277/96.2
3,923,667 2/1975 Lachman ............................. 277/96.2

Primary Examiner—Robert I. Smith
Attorney, Agent, or Firm—Lane, Aitken & Zeims

[57] ABSTRACT

A fluid seal is composed of an upper oxidized sintered metallic layer and a lower unoxidized sintered metallic layer integral with the upper layer. The upper layer is in rubbing contact with the radial surface of a rotating matrix of the regenerator portion of a gas turbine engine and the lower layer is connected through metal bellows to the housing of the matrix.

5 Claims, 7 Drawing Figures

RUBBING CONTACT FLUID SEAL

This invention relates to a rubbing contact fluid seal suitable for use in a rotary regenerator of a gas turbine engine applications and a method of making the same seal.

Currently, there is a family of gas turbine engines which use rotating disc-type regenerators to recover useable heat from exhaust gases to preheat incoming combustion air. A necessary requirement of the regenerator system is an effective seal across the faces of the rotating disc to prevent leakage of the high pressure incoming air into the counterflowing exhaust gas. A rubbing seal is desired as it has the potential for lowest leakage. These rubbing seals are required to operate at a maximum temperature of about 300° C. on the outboard or cold side of the seal, and at temperature up to 650° C. on the inboard or hot side of the seal. The desired properties of the rubbing seal material are that it has good oxidation resistance and thermal stability, good wear resistance, and a relatively low coefficient of friction over a wide range of temperatures.

Accordingly, the rubbing seal is usually made by, for example, so-called flame or plasma spraying a mixture of nickel oxide (NiO) and calcium fluoride ($CaF_2$) etc. on the surface of a substrate made of a metal such as a stainless steel, or brazing a sintered member made of NiO and $CaF_2$ etc. on the surface of the substrate. However, the rubbing seals made by these methods have a shortcoming in that when the rubbing seal is worn out and the substrate is exposed, the substrate becomes in direct rubbing contact with the rotating surface of a disc-type or annular matrix made of ceramic material and therefore the expensive matrix is damaged by the substrate.

It is, therefore, a main object of the present invention to provide an improved rubbing contact fluid sealing member capable of preventing the damage of a rotating member which is in rubbing contact with the sealing member.

It is another object of the present invention to provide an improved fluid seal for use in the rotary regenerator portion of a gas turbine engine, capable of preventing damage to a rotating matrix of the regenerator portion.

It is a further object of the present invention to provide an improved fluid seal for use in the rotary regenerator portion of a gas turbine engine, which seal does not require a substrate therefor and is directly secured to a flexible member which urges the fluid seal to the radial face of a rotating matrix of the regenerator portion and is secured to the housing of the matrix.

It is a still further object of the present invention to provide an improved fluid seal for use in the regenerator portion of a gas turbine engine, which seal is composed of an oxidized layer which is in rubbing contact with the surface of a rotating matrix of the regenerator and an unoxidized layer which is formed integral with the oxidized layer.

Other objects, features and advantages of the present invention will become more apparent from the following description of the invention with reference to the accompanying drawings, in which.

Figure 1:
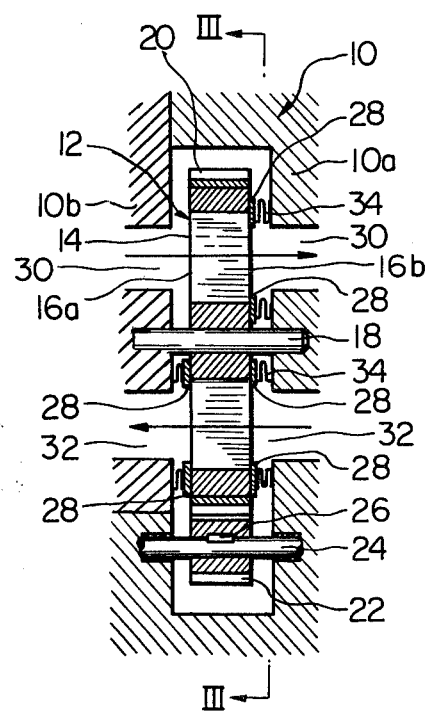
FIG. 1 is a schematical section view of a preferred embodiment of the regenerator portion of a gas turbine engine having fluid seals in accordance with the present invention.
Figure 2:
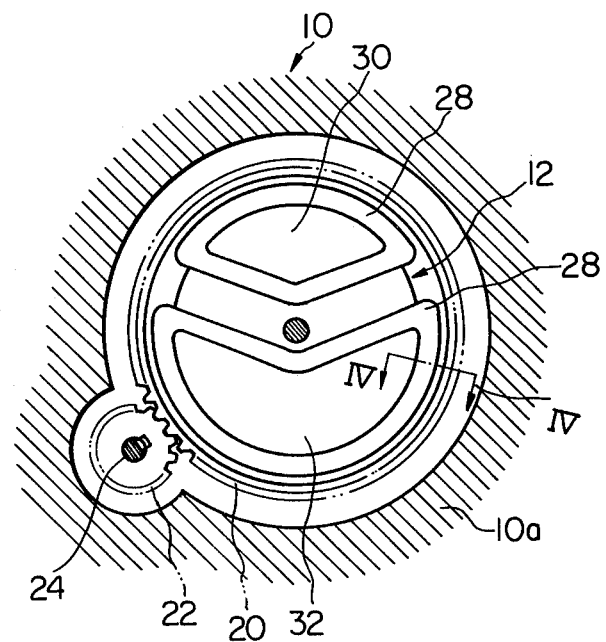
FIG. 2 is a sectional view taken along a line III—III of FIG. 1.

FIGS. 1 and 2 generally show schematically a disc-type rotary regenerator portion of a gas turbine engine (not shown). The regenerator comprises a housing 10 which is generally made up of a vessel member 10a and a cover member 10b. The housing 10 encloses an annular matrix 12 or a rotating member which is made of a ceramic material and of a structure defining pores or passages 14 extending between the opposed radial faces 16a and 16b of the matrix 12 generally parallel to the axis of rotation defined by a shaft 18. The shaft 18 is fixedly inserted into the casing 10 and accordingly the matrix 12 is disposed rotatably around the shaft 18 through its bearing portion (no numeral). The matrix 12 may be fabricated from alternate spiral layers of flat and corrugated ceramic sheets.

Securely disposed at the outer peripheral portion of the matrix 12 is a ring gear member 20 meshing with a pinion gear 22 which is secured to a driving shaft 24 with a key 26. Consequently, rotation of the driving shaft 24 causes the matrix 12 to rotate around the shaft 18.

Fluid seals 28 or rubbing contact sealing members are provided between each radial face of the matrix 12 and the housing 10 in rubbing contact with the rotating matrix 12 to confine cold compressed air and hot exhaust gas passages 30 and 32 formed through the matrix 12 and thereby minimizing leakage between the passages 30 and 32. The seals 28 are supported and urged to the radial faces of the matrix by means of, for example, metal bellows 34 or heat resistant flexible members which are secured to the inner surface of the housing 10. The streams of the compressed air and the exhaust gas are in counterflow relation as indicated by arrows in FIG. 1.

Figure 3:
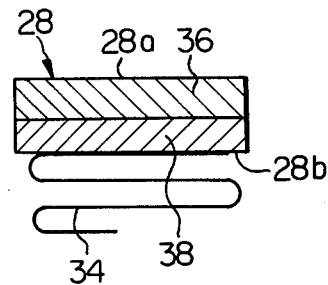
FIG. 3 is a vertical sectional view taken along a line IV—IV of FIG. 2.
Figure 4:
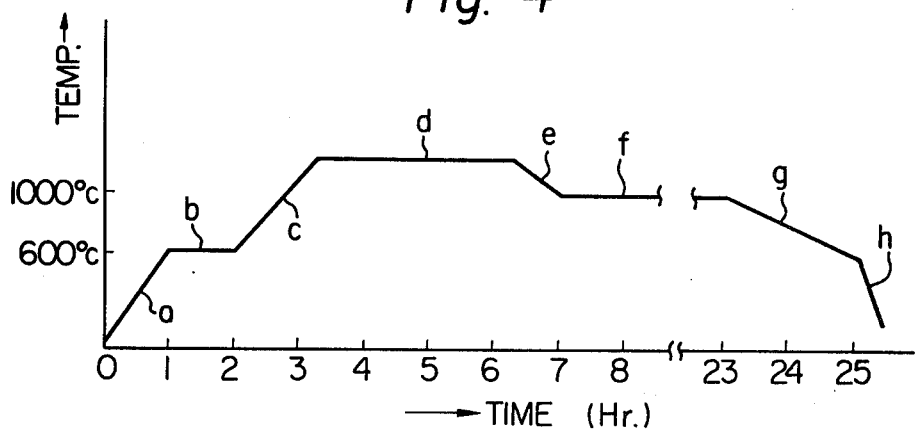
FIG. 4 is a graph showing a heat treating process for making the fluid seal according to the present invention.

As clearly shown in FIG. 3, the seal 28 is composed of an upper oxidized sintered metallic layer 36 and a lower unoxidized sintered metallic layer 38 which is integral with the upper layer 36. The top flat surface portion 28a of the seal 28 is arranged to be in rubbing contact with the radial faces 16a or 16b of the matrix 12 and the bottom surface portion 28b is movably connected through the metal bellows 34 to the inner surface of the housing 10.

The method of making the seal 28 will be hereinafter discussed with reference to FIGS. 4, 5, 6 and 7.

Figure 5:
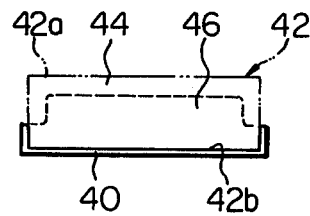
FIG. 5 is a schematical view showing measures for forming two different layers in the fluid seal according to the present invention.

At first, powdered metallic nickel (Ni), nickel oxide (NiO) and calcium fluoride ($CaF_2$) are mixed respectively, for example, in the ratio by weight of 34.4:43.7:21.9. The mixed powders are pressed in a mold to form the mixed powders into a predetermined shape having a first flat surface portion 42a corresponding to the top surface portion 28a of the seal 28 and a second flat surface portion 42b corresponding to the bottom flat surface portion 28b of the seal 28, as shown in FIG. 5. The molded mixture is thereafter treated within a closed furnace in accordance with the process shown in FIG. 4 wherein the molded mixture is firstly heated in the atmosphere of nitrogen gas ($N_2$) at about 600° C. for about 1 hour to partially sinter the molded mixture as indicated at segments a and b in FIG. 4. Subsequently, the temperature within the furnace is raised to a level ranging from 1200° C. to 1300° C. and then this temperature level is maintained for about 3 hours to sinter the whole molded mixture as indicated at segments c and d in FIG. 4. Thereafter, the temperature within the furnace is lowered to about 1000° C. and the nitrogen gas within the furnace is replaced with air. The temperature of 1000° C. is maintained for about 16 hours introducing a stream of air into the furnace to oxidize the sintered mixture as indicated at segments e and f in FIG. 4. Thereafter, the temperature within the furnace is lowered as indicated at a segment g in FIG. 4 to gradually cool the oxidized sintered mixture and subsequently the oxidized sintered mixture is air-cooled as indicated at a segment h in FIG. 4. After being taken out from the furnace, the sintered mixture is cut to a required dimension and then the surface 42a thereof is polished.

In order to form the oxidized sintered metallic layer 36 and the sintered metallic layer 38 in the seal 28 as shown in FIG. 3, a heat resistant material 40 such as a heat resistant tape is put to cover a surface portion of the molded mixture 42 containing a second flat surface portion 42b corresponding to the bottom flat surface portion 28b of the seal 28 allowing the other surface portion of the molded mixture 42 containing a first flat surface portion 42a corresponding to the top flat surface portion 28a of the seal 28 to be open or exposed to the atmosphere of air as shown in FIG. 5, before putting the molded mixture into the furnace. Therefore, during the oxidation process, the other surface portion of the molded mixture containing the first flat surface portion 42a is exposed to the atmosphere of air and subjected to the oxidation, whereas the surface portion containing the second flat portion 42b is not subjected to the oxidation. It will be understood that the oxidation of the sintered molded mixture proceeds from its surface portion into its inner portion to form an oxidized layer 44. Accordingly, after the oxidation process, the oxidized layer 44 and an unoxidized layer 46 are formed in the sintered molded mixture as seen in FIG. 5, the oxidized layer 44 and the unoxidized layer 46 respectively corresponding to the oxidized sintered metallic layer 36 and the sintered metallic layer 38 of the seal 28.

Figure 6:
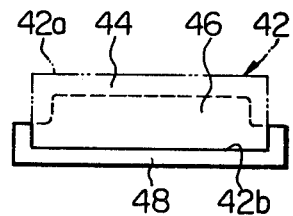
FIG. 6 is a schematical view showing another measures for forming the layers same as those of FIG. 5.

FIG. 6 shows another measures for forming the oxidized layer 44 and the unoxidized layer 46 of the sintered molded mixture, in which a surface portion of the molded mixture 42 containing the second flat surface portion 42b is covered with a casing member 48, prior to putting the molded mixture 44 into the furnace. It will be understood that the second flat surface portion 42b is not subjected to the oxidation during the oxidation process.

Figure 7:
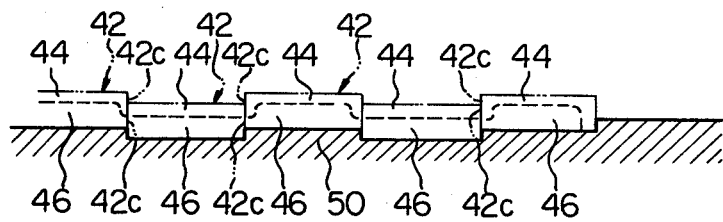
FIG. 7 is a schematical view showing further measures for forming the layers same as those of FIG. 5.

FIG. 7 shows further measures for forming the oxidized layer 44 and the unoxidized layer 46 of the sintered molded mixture 42, wherein the floor 50 of the furnace is formed into a stepped shape illustrated in FIG. 7 and the molded mixtures 42 are put on the floor 50 so that adjacent molded mixtures are in contact with each other at their side surfaces 42c. Accordingly, as appreciated from the figure, the oxidized layer 44 and the unoxidized layer 46 are formed in the sintered molded mixture after the oxidation process.

As is apparent from the foregoing discussion, the fluid seal according to the present invention does not require a substrate on which the fluid seal is secured and accordingly can be directly secured to a flexible member such as the metal bellows, since the unoxidized layer of the seal serves as the substrate. Consequently, even if the oxidized layer of the fluid seal is worn out, the unoxidized layer of the seal will become in rubbing contact with the radial face of the rotating matrix and therefore the matrix is not subjected to damage. This results from the fact that the unoxidized layer of the seal has a somewhat lubricating ability and is soft as compared with the substrate made of a metal such as a stainless steel.

What is claimed is:

1. A rubbing contact fluid sealing member comprising an oxidized sintered metallic layer in rubbing contact with a rotating member and an unoxidized sintered metallic layer formed integral with said oxidized sintered metallic layer, said sealing member produced by first sintering a mixture of metallic nickel, nickel oxide and calcium fluoride powders to form a sintered metal and then exposing a predetermined portion of the surface of the sintered metal to a high temperature air stream to form said oxidized sintered metallic layer, the unexposed portion of the surface of the sintered metal remaining unoxidized to form said unoxidized sintered metallic layer.

2. A fluid seal for the rotary regenerator portion of a gas turbine engine, said fluid seal comprising an oxidized sintered metallic layer having a flat surface in rubbing contact with a radial face of a rotatable annular ceramic matrix of the regenerator portion and an unoxidized sintered metallic layer formed integral with said oxidized sintered metallic layer at a surface of said fluid seal opposite to the contacting surface of said oxidized sintered metallic layer, said seal produced by first sintering a mixture of metallic nickel, nickel oxide and calcium fluoride powders to form a sintered metal and then exposing a predetermined portion of the surface of the sintered metal to a high temperature air stream to form said oxidized sintered metallic layer, the unexposed portion of the surface of the sintered metal remaining unoxidized to form said unoxidized sintered metallic layer.

3. A fluid seal for use in the rotary regenerator portion of a gas turbine engine, comprising an oxidized sintered metallic layer with its surface in rubbing contact with a radial face of a rotatable annular ceramic matrix of the regenerator portion and an unoxidized sintered metallic layer formed integeral with said oxidized sintered metallic layer at a surface of said fluid seal opposite to the contacting surface of said oxidized sintered metallic layer, said unoxidized sintered metallic layer being movably connected to the housing of said matrix, said fluid seal produced by mixing powdered metallic nickel, nickel oxide and calcium fluoride, pressing the mixed powders to form a predetermined shape, sintering the pressed mixture to form a sintered metal, and finally exposing a predetermined portion of the surface of the sintered metal to a high temperature air stream to form said oxidized sintered metallic layer, the unexposed portion of the surface of the sintered metal remaining unoxidized to form said unoxidized sintered metallic layer.

4. A fluid seal for use in the regenerator portion of a gas turbine engine comprising a top flat surface portion which is in rubbing contact with a radial face of a rotatable annular ceramic matrix of the regenerator portion and a bottom flat surface portion opposite to said top surface portion and movably connected to the housing of the matrix, said fluid seal produced by:

mixing powdered metallic nickel, nickel oxide and calcium fluoride;

molding the mixed powders into a predetermined shape by pressing the mixed powders in a mold to form a molded mixture having a first flat surface portion corresponding to the top flat surface portion of said fluid seal and a second flat surface portion opposite to the first flat surface portion, said second flat surface portion corresponding to the bottom flat surface portion of said fluid seal;

covering a predetermined portion of the molded mixture surface, including said second flat surface portion, with a heat resistant material while leaving the remaining portion of said molded mixture surface, including said first flat surface portion, exposed to the environment;

sintering the partially covered mixture; and placing the sintered mixture in atmosphere of high temperature air to form an oxidized metallic layer at said exposed portion of said sintered mixture, a part of which constitutes said top flat surface of the fluid seal, the covered portion of the surface of the sintered mixture remaining unoxidized to form an unoxidized sintered metallic layer, a part of which constitutes said bottom flat surface portion of the fluid seal.

5. A regenerator portion of a gas turbine engine, comprising:

a housing;

an annular matrix of ceramic material disposed rotatably within said housing and including axially oriented passages extending between the opposite radial faces thereof;

a fluid seal comprising an oxidized sintered metallic layer in contact with the radial face of said annular matrix and an unoxidized sintered metallic layer formed integral with said oxidized sintered metallic layer, said fluid seal produced by first sintering a mixture of metallic nickel, nickel oxide and calcium fluoride powders to form a sintered metal and then exposing a predetermined portion of the surface of the sintered metal to a high temperature air stream to form said oxidized sintered metallic layer, the unexposed portion of the surface of the sintered metal remaining unoxidized to form said unoxidized sintered metallic layer; and a heat resistant flexible member connecting said unoxidized sintered metallic layer to the inner surface portion of the housing for urging said oxidized sintered metallic layer into contact with the radial face of said annular matrix.

* * * * *